(12) United States Patent
Kaplan et al.

(10) Patent No.: US 9,781,089 B2
(45) Date of Patent: Oct. 3, 2017

(54) AUTHENTICATING A USER ACCOUNT WITH A CONTENT MANAGEMENT SYSTEM

(71) Applicant: Dropbox, Inc., San Francisco, CA (US)

(72) Inventors: Josh Kaplan, San Francisco, CA (US); Adam Cook, San Francisco, CA (US); Stephen Poletto, San Francisco, CA (US); Thomas Wright, San Francisco, CA (US); Luke Faraone, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 2 days.

(21) Appl. No.: 14/607,625

(22) Filed: Jan. 28, 2015

(65) Prior Publication Data

US 2016/0219027 A1 Jul. 28, 2016

(51) Int. Cl.
*G06F 17/22* (2006.01)
*H04L 29/06* (2006.01)
*H04W 12/06* (2009.01)

(52) U.S. Cl.
CPC .......... *H04L 63/08* (2013.01); *G06F 17/2235* (2013.01); *H04L 63/0815* (2013.01); *H04W 12/06* (2013.01)

(58) Field of Classification Search
CPC . H04L 63/08; H04L 63/0815; G06F 17/2235; H04W 12/06
See application file for complete search history.

(56) References Cited

U.S. PATENT DOCUMENTS

| 7,113,981 | B2 | 9/2006 | Slate | |
|---|---|---|---|---|
| 7,606,918 | B2* | 10/2009 | Holzman | H04L 63/08 709/206 |
| 8,315,620 | B1 | 11/2012 | Williamson et al. | |
| 2006/0206709 | A1* | 9/2006 | Labrou | G06Q 20/18 713/167 |
| 2007/0053518 | A1* | 3/2007 | Tompkins | G06Q 20/12 380/270 |
| 2008/0039062 | A1* | 2/2008 | Laursen | G06F 21/41 455/419 |
| 2008/0152099 | A1* | 6/2008 | Bilstad | G06F 21/35 379/93.02 |
| 2009/0260064 | A1* | 10/2009 | McDowell | G06F 21/10 726/4 |
| 2010/0274859 | A1* | 10/2010 | Bucuk | H04L 63/08 709/206 |

(Continued)

FOREIGN PATENT DOCUMENTS

WO 2008/134531 A1 11/2008

*Primary Examiner* — Joseph P Hirl
*Assistant Examiner* — J. Brant Murphy
(74) *Attorney, Agent, or Firm* — Polsinelli PC

(57) ABSTRACT

Systems, methods, and computer-readable storage media for authenticating a user account with a content management system are disclosed. A synchronized content management system may receive an identifier via a first access platform. The identifier may be associated with a device. The content management system can generate a link based on the identifier and the device. The link may be then send to the device by using the identifier. When accessed by the device, the link may authenticate a user account associated with the device at a second access platform.

14 Claims, 7 Drawing Sheets

(56) References Cited

U.S. PATENT DOCUMENTS

| | | | | |
|---|---|---|---|---|
| 2011/0066503 A1* | 3/2011 | Kanapur | ............ | G06Q 30/0267 |
| | | | | 705/14.64 |
| 2011/0239278 A1* | 9/2011 | Downey | ............... | H04L 63/083 |
| | | | | 726/4 |
| 2011/0269436 A1* | 11/2011 | Porco | .................. | G07F 17/3237 |
| | | | | 455/414.1 |
| 2012/0028609 A1* | 2/2012 | Hruska | .............. | G06Q 20/3674 |
| | | | | 455/411 |
| 2012/0315993 A1* | 12/2012 | Dumont | .............. | G07F 17/3225 |
| | | | | 463/42 |
| 2013/0198516 A1* | 8/2013 | Fenton | ................ | H04L 63/0869 |
| | | | | 713/168 |
| 2013/0318589 A1* | 11/2013 | Ford | ....................... | H04L 63/08 |
| | | | | 726/7 |
| 2013/0332607 A1* | 12/2013 | Santamaria | ........... | G06F 15/173 |
| | | | | 709/225 |
| 2014/0080470 A1* | 3/2014 | Beenau | .................. | G06Q 20/32 |
| | | | | 455/418 |
| 2016/0182479 A1* | 6/2016 | Kaplan | ................. | H04L 51/046 |
| | | | | 726/6 |

\* cited by examiner

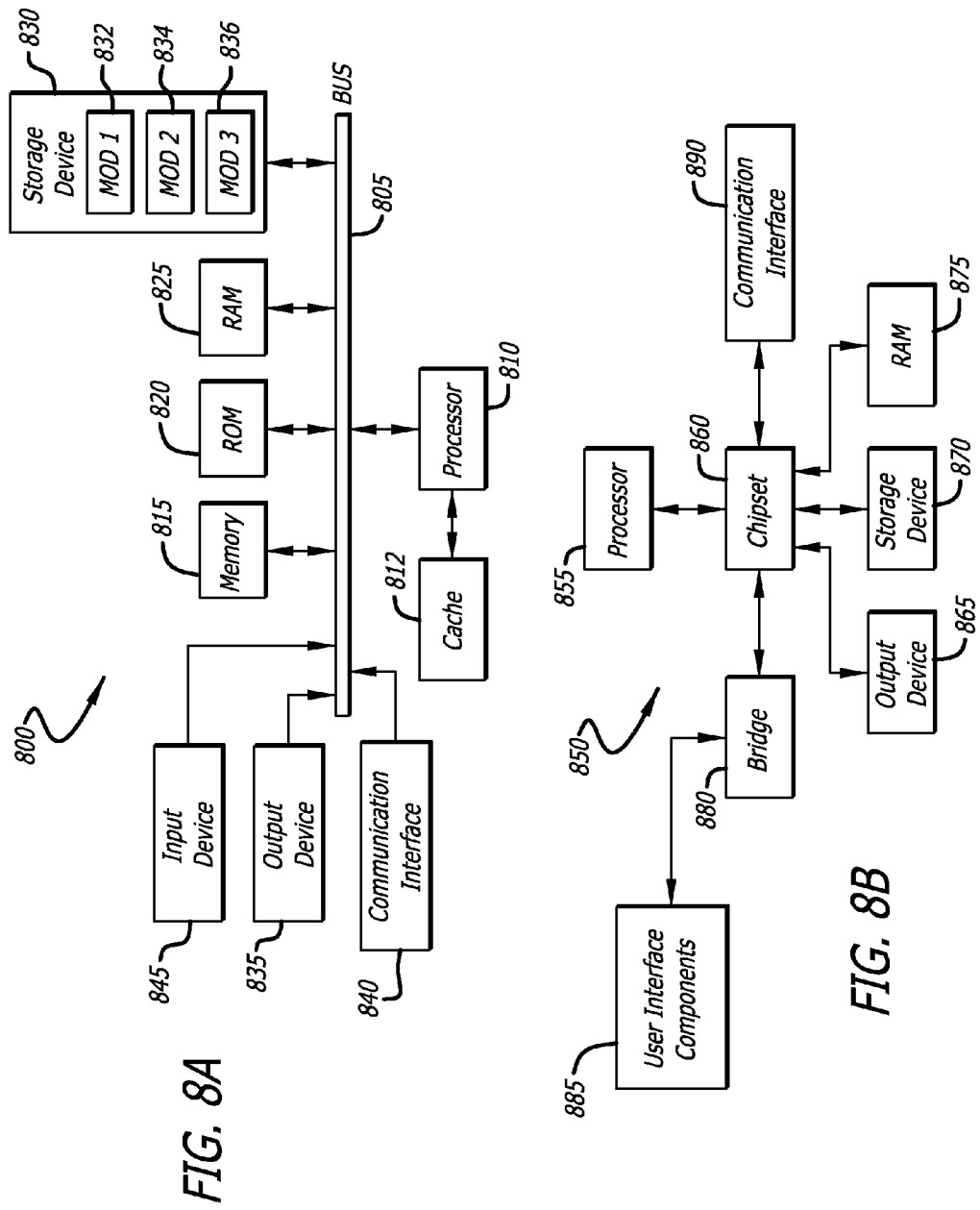

AUTHENTICATING A USER ACCOUNT WITH A CONTENT MANAGEMENT SYSTEM

TECHNICAL FIELD

The present technology pertains to content delivery, and more specifically pertains to automatically logging an access platform into a user account for a content management system.

BACKGROUND

An online synchronized content management system, such as Dropbox from Dropbox Inc. of San Francisco, Calif., allows its users to store and synchronize data on a cloud-based storage and across multiple client devices. Thus, for example, a user may upload a personal folder to the content management system, and then authorize multiple user devices to make duplicate copies of the folder on each of the devices. The instances of the folder can be kept synchronized across the devices. In other words, through the process of synchronization, the contents of the folder on multiple client devices can be kept identical. Even the slightest modification made by the user to one of the instances of the folder can automatically be replicated in other instances of the folder in a matter of seconds.

A content management system can allow the user to synchronize data stored on multiple devices. For example, a user may synchronize the files and folders stored on her laptop computer with the content management system. Later on, she may want to jump on to her tablet PC and also synchronize the data stored on the tablet PC with the content management system and the laptop computer. Before synchronizing any data with the content management system, a user typically has to authenticate her user account with the system by providing her username and password. This means that the user may have to enter the same username and password for every one of the devices or platforms that she may choose to use to synchronize or access data on the content management system.

Users may find entering the same username and password multiple times to be redundant and cumbersome to the user. For example, a user who is using a web browser on a desktop computer may type in her username and password to connect to the content management system. If she decides, however, to use the desktop client application that is installed on the same desktop computer, she may be asked to provide the same username and password to the client application to authenticate her user account again, even though she had just typed in the same information on the same computer a few seconds ago. Moreover, entering user credentials such as username and password can be more challenging on some devices. For instance, a set-top box connected to a television typically does not offer a keyboard input method, and therefore a user may have to use a remote control to enter text. Since a remote control has a limited number of keys and slow reaction time, it may be difficult to enter a long or complex string of text.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for authenticating user accounts with a content management system. Specifically, the disclosed technology solves a problem that uniquely arises in the fields of computer technology, Internet communications, and networking, where identities of people and devices need to be ascertained and verified digitally. Thus, the disclosed solution is rooted in computer technology in order to overcome a problem specifically arising in the computer networks. Indeed, the subject technology improves the functioning of the computer by allowing it to log into a user account more easily and more securely.

This disclosure describes a mechanism for a user to authenticate her user account on one access platform and then have her user account automatically authenticated on another access platform. For example, a user can connect to a content management system at a first access platform such as the content management system's website. At the first access platform, the user can authenticate herself and provide a unique identifier for a second access platform. The second access platform can be a different application or a device. The identifier can be, for example, a phone number. Once the content management system receives the identifier through the first access platform, the system can generate a link. The link can include a special security code that is tied to the user account and/or the second access platform. The content management system can send the link to the second access platform by using the identifier that has been provided through the first access platform. When the link is accessed by the user at the second access platform, the user account can be authenticated at the second access platform without requiring the user to provide a username or password.

For example, the website for the content management system can include a text field for the user to input a phone number of the user's mobile device. Upon receiving the phone number, the content management system can generate a uniform resource locator (URL) link that has a unique code embedded in it. The content management system can send a text message including the URL link to the mobile device. When the user activates the link on the mobile device, the mobile client application installed on the mobile device can be launched and the code included in the link can sign the user into her user account. Thereafter, when the user accesses the client application from the mobile device, the user can be automatically signed into her account. However, if the mobile device does not have the client application already installed on the device when the user activates the link, the device can navigate to a location, such as an application store, where the client application can be downloaded on to the device.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8A shows a conventional system bus computing system architecture; and

FIG. 8B shows a computer system having a chipset architecture.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

As used herein, the term "access platform" may refer to a platform, method, or interface that can be used to access content that is stored in a content management system or any system that requires authentication. The access platform may refer to a hardware device, such as a computer, a telephone, a tablet, a set-top box, etc., or a software application, such as a web browser, a dedicated client application, a desktop application, a mobile application, etc. The access platform can also be a combination of both hardware and software components. In addition to accessing content, the access platform may also be used to synchronize content data with the content management system. For example, a client application running on a desktop computer can monitor the local content data stored in the desktop computer and synchronize the data with the content management system. Similarly, a mobile client application running on a smartphone can synchronize local content with the content management system and/or allow a user to access any data synchronized and stored in a remote server. In another example, a user can use a web browser to navigate to the content management system's website and access the synchronized data or manage her user account via a web interface.

Access platforms may be required to authenticate a user account before allowing the user to communicate with the content management system and access any synchronized data. For example, a desktop client application may ask the user to provide a username and password to log into the application first before any data can be synchronized or accessed. Similarly, the user may have to provide her username and password to the content management system's website before accessing the synchronized data through the web interface.

Figure 1:
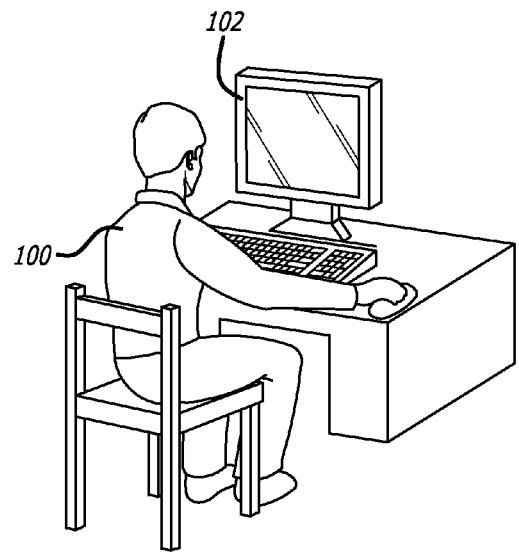
FIG. 1 shows an exemplary first access platform accessed by a user.

The disclosed technology addresses the need in the art for authenticating users for an online content management system. FIG. 1 shows an exemplary first access platform, which, in this example, is desktop computer 102 accessed by user 100. User 100 may have a user account with an online content management system, such as a fictional content management system named ExampleCMS, which may be accessed via the web at the URL "examplecms.com." Alternatively, user 100 may have the user account with a system that requires authentication but is not an online content management system. User 100 can access the content management system on various client devices such as desktop computer 102, as well as a laptop computer, a tablet computer, a set-top box, a mobile device, a smartphone, a wearable computing device, a dongle, etc. The user device(s) may have the capability to communicate with the content management system via a network (not shown) such as the Internet. User 100 can access his user account and its associated content data by using a desktop application, such as a web browser, on his desktop computer 102. Although FIG. 1 shows user 100 as using desktop computer 102, one of ordinary skill in the art will understand that user 100 may also access ExampleCMS from other access platforms such as the various types of computing devices mentioned above. For example, user 100 may use a first access platform, such as desktop computer 102, to access the content management system, and then hop on to a second access platform, such as a mobile device, to continue accessing the content management system. In another example, user 100 can log on to the content management system on a dedicated client app on a tablet PC as the first access platform, but choose to continue the access on the same tablet PC's web browser as the second access platform. It may also be possible to access the content management system via the first access platform and the second access platform concurrently.

Figure 2:
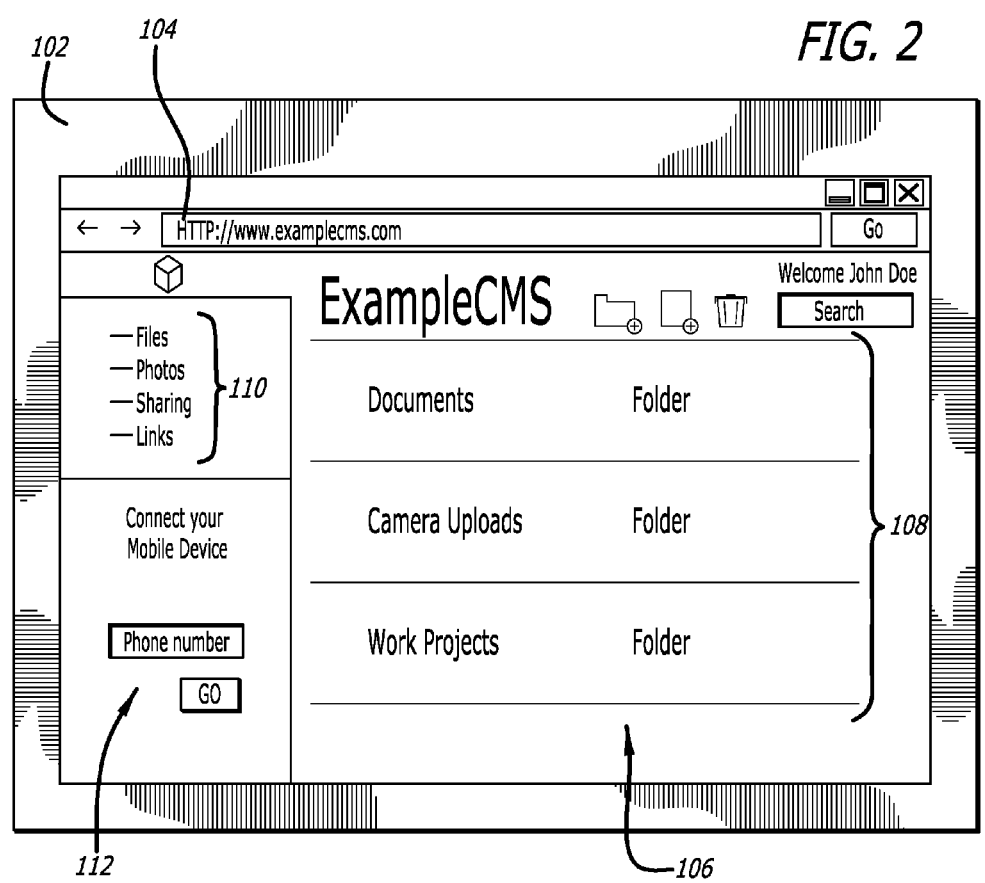
FIG. 2 shows an exemplary embodiment of a first access platform for accessing a content management system.

FIG. 2 shows an exemplary embodiment of a first access platform for accessing a content management system. The first access platform can be web interface 106, as displayed on a web browser running on desktop computer 102. The browser's address bar is currently displaying the exemplary content management system's web address, "http://www.examplecms.com." Web interface 106 may display the content management system's logo (i.e., "ExampleCMS"), login information (i.e., "Welcome John Doe"), a search bar, menu items 110, icons, links, and commands. For example, menu items 110 may allow the user to select different commands via web interface 106, such as "Files," "Photos," "Sharing," and "Links" Other graphical elements such as icons may allow the user to create folders, upload files, or delete files. Content display area 108 displays a list of individual files and folders that are associated with the user account. For example, FIG. 2 shows three folders, "Documents," "Camera Uploads," and "Work Projects," in content display area 108.

Exemplary web interface 106 shows that the user has already logged into the content management system's website as "John Doe." Web interface 106 may have required the user to provide user credentials such as a username and password to authenticate the user account on the web browser. Once the user is authenticated, the web browser may store a piece of data, such as a Hypertext Transfer Protocol (HTTP) cookie, on desktop computer 102 in order to keep track of the user's identification and maintain the authenticated session with the content management system. Although FIG. 2 shows web interface 106 as an example of the first access platform, via which the user may access the content management system, one of ordinary skill in the art will recognize that other access platforms, such as a web browser on a mobile device, a mobile app, a content management system client application, etc. may also be used as the first access platform. The user may, however, wish to access ExampleCMS from a second access platform such as a mobile device, which would typically require the user to authenticate his user account at the second access platform by providing the same user credentials for the second time. To address this inconvenience that arises specifically in the field of computer networks, the first access platform can offer a more streamlined way of authentication for the second access platform.

Web interface 106 may offer user input area 112, which allows the user to enter additional information so that the user can access the content management system from the second access platform without needing to have his user account authenticated again at the second access platform. In this particular example, the second access platform is a mobile device and the additional information provided by the user is a phone number. Accordingly, exemplary user input area 112 displays the message, "Connect your Mobile Device," to invite the user to enter the phone number associated with his mobile device such that the user can access the content management system from the mobile device. However, a person of ordinary skill in the art will understand that the second access platform need not be limited to a mobile device. The second access platform can be, for example, other types of devices such as a laptop computer, a tablet computer, a set-top box, a mobile device, a smartphone, a wearable computing device, a dongle, etc. The second access platform can also be a different software application, such as a web browser, a dedicated client application, a desktop application, a mobile application, a widget, an applet, etc. The additional information provided by the user can be any information that may uniquely identify a device or an application. In other words, the information can be an identifier associated with the second access platform. For example, the identifier can be a phone number, an Internet Protocol (IP) address, a media access control (MAC) address, an email address, a mailing address, a serial number, a user account number, etc. In certain aspects, the first access platform and the second access platform may be disparate applications running on the same device. For example, the first access platform can be a mobile web browser application running on a mobile phone, while the second access platform can be a native mobile application running on the same mobile phone. In other aspects, the first access platform and the second access platform can be applications running on disparate devices. In still other aspects, each of the first access platform and the second access platform can be a device. For example, the first access platform can be a laptop computer while the second access platform can be a tablet device regardless of what kinds of applications are used to access the content management system on each of those devices.

Figure 3A:
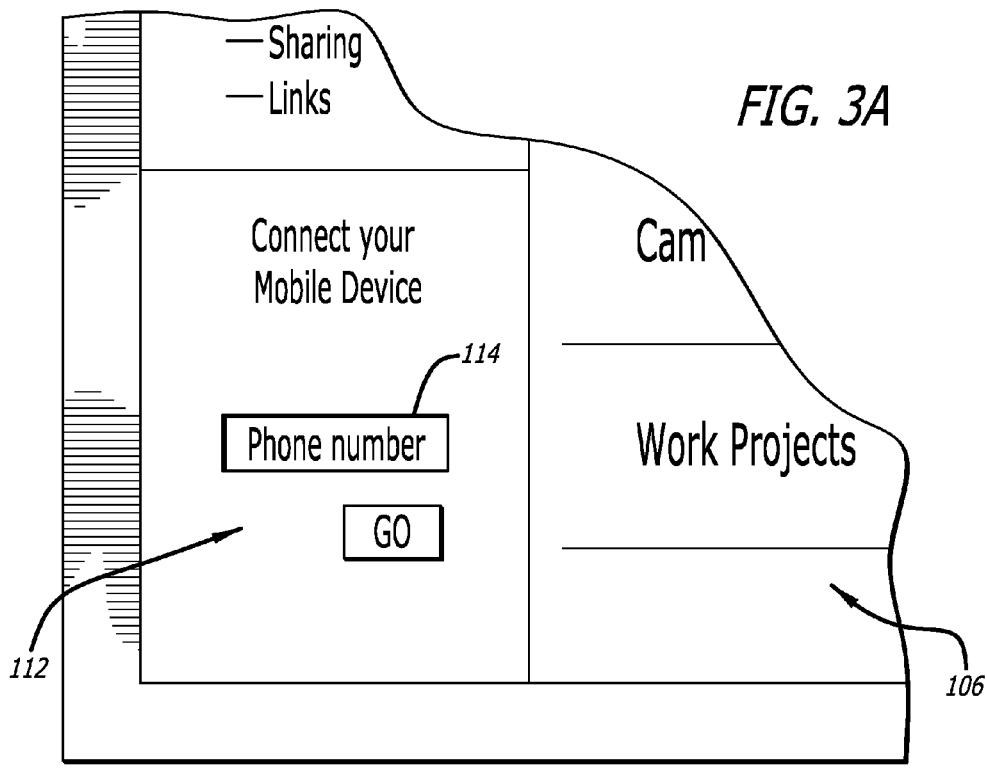
FIG. 3A shows an exemplary interaction with the first access platform.

FIG. 3A shows an exemplary interaction with the first access platform of FIG. 2. User input area 112 may include text field 114, where the user can enter the additional information. Various input devices, such as a keyboard, a mouse, a touchpad, a touchscreen, a microphone for speech recognition, a camera for gesture recognition, etc., may be used to enter the information. The user can, for example, type in the phone number associated with his smartphone into the text field by typing on a keyboard. As discussed above, depending on what the second access platform is, user input area 112 may ask the user to enter other types of identifiers, such as an IP address, a MAC address, an email address, a mailing address, a serial number, etc.

Figure 3B:
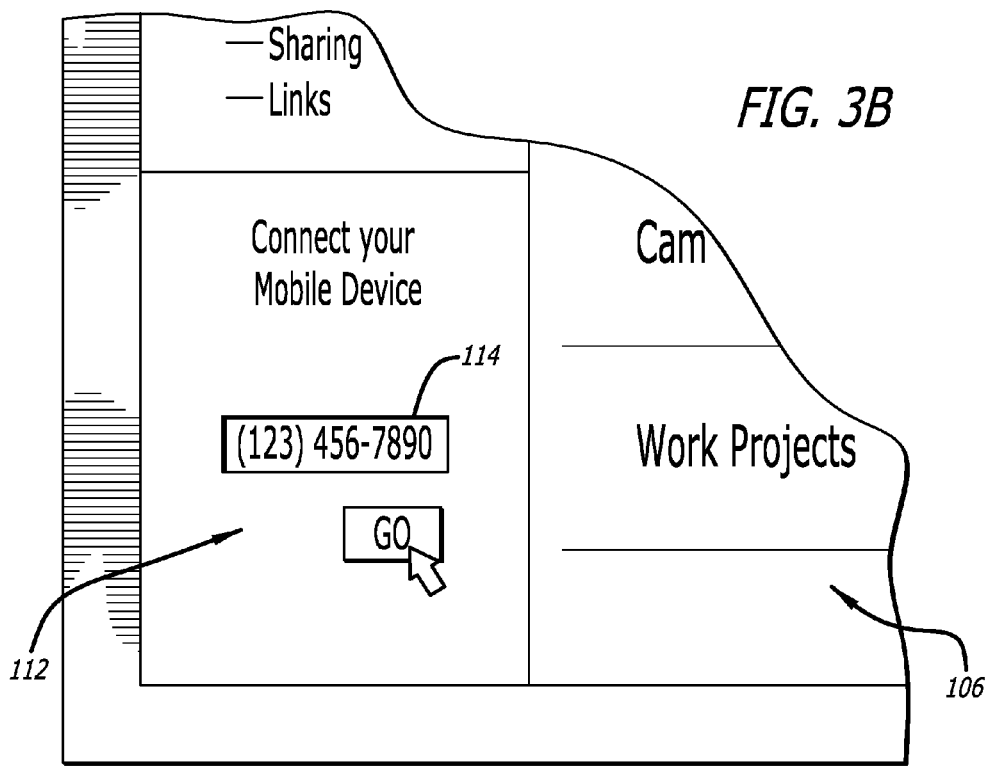
FIG. 3B shows a subsequent exemplary interaction with the first access platform.

FIG. 3B shows a subsequent exemplary interaction with the first access platform of FIG. 2. Once the identifier information is entered into text field 114, the user can submit the data to the content management system by, for example, clicking on the "GO" button provided in user input area 112 with a mouse. Other input methods, such as a keyboard stroke, a tap, a swipe, a voice command, a gesture, etc., may also be used to submit the entered data.

Figure 4:
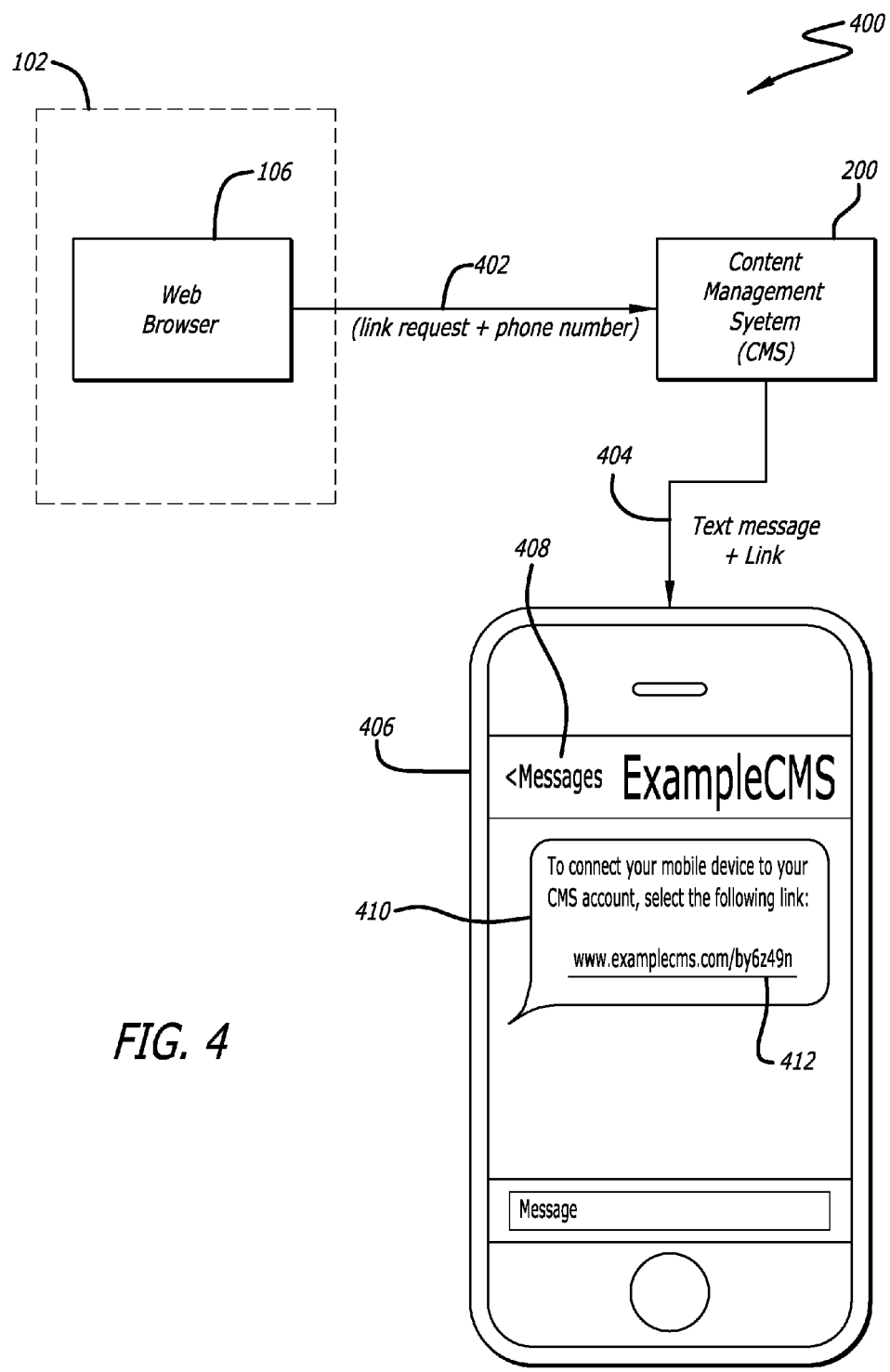
FIG. 4 shows an exemplary embodiment, in which the content management system transmits a link to a second access platform.

FIG. 4 shows an exemplary embodiment, in which the content management system transmits a link to a second access platform. In this example embodiment 400, the user sends a link request and an identifier such as a phone number (402) via the first access platform, such as a web interface or web browser 106 running on desktop computer 102, to content management system (CMS) 200. The identifier may be uniquely associated with the second access platform. After receiving the request and the identifier, CMS 200 can generate a link based on the identifier. The link can include a uniform resource locator (URL). Furthermore, the link can be designed to, upon being accessed, trigger authentication of a user account at the second access platform. In other words, the link can be used to connect or associate the second access platform with the user account that was used to access CMS 200 at the first access platform (i.e., web browser 106). The link can include a piece of security code that may be recognized by CMS 200 to authenticate the user account that submitted the identifier at the first access platform. This security code (also called a "token") can be unique to the user account and/or the second access platform such as mobile phone 406. Thus, unique identifier(s) associated with the user account or the device can be encoded and embedded in the security code. The unique piece of code can be, for example, a hexadecimal or alphanumeric value that is long enough to be spoof-tolerant or spoof-resistant. The security code may expire after a one-time or limited-time use. The security code may also expire once a predetermined time period elapses after its generation or issuance. CMS 200 may store the security code so that it can be compared with a value subsequently received by the second access platform when the link is accessed later.

After generating the link, CMS 200 can send the link to the second access platform by using the identifier and through a delivery mechanism that is available to the second access platform. In example embodiment 400, the delivery mechanism is text messaging, which is available to mobile phone 406. Thus, CMS 200 can send a text message (i.e., Short Message Service (SMS) message) containing the authentication link to mobile phone 406 via the phone number provided from web browser 106 (404). Depending on the type of the second access platform, other delivery mechanisms may be used to transmit the link to the second access platform. The other delivery mechanisms may include an email, a letter, an instant message (IM), a Multimedia Messaging Service (MMS) message, a private message (PM), a phone call, a video call, etc.

In this example, the second access platform is mobile phone 406, or more specifically an application running on mobile phone 406. The application can be a native mobile app such as a dedicated client app for content management system 200. For example, the application can be an Android® app installed on a smartphone running a version of the Android® operating system. In another example, the app can be an iOS® app installed on an iPhone®. The second access platform may also be a mobile web browser running on mobile phone 406. In addition, the second access platform can be a device itself, such as a desktop computer, a laptop computer, a tablet computer, a set-top box, a mobile device, a smartphone, a wearable computing device, a dongle, etc. If the second access platform is a device, then accessing the link can authorize or authenticate the entire device to be used with the user account regardless of what kinds of applications may be used on the device. For example, if the link is configured to authorize a desktop computer as the second access platform, then both the web browser navigating to the CMS's website and the desktop computer's dedicated client application can be authorized.

In exemplary embodiment 400, mobile phone 406 may receive the text message via its messaging app 408. Messaging app 408 is shown as displaying the recently received text message 410 containing an instruction ("To connect your mobile device to your CMS account, select the following link:") and link 412 ("www.examplecms.com/by6z49n"). Depending on the delivery mechanism being used, different types of applications may be used to receive link 412 and present it to the user at the second access platform. After link 412 is received at the second access platform, such as mobile device 406, the user of mobile device 406 can access the link by, for example, tapping or clicking on link 406. Link 406 can be a hyperlink that, when accessed, triggers a handler app (e.g., a web browser) to navigate to the appropriate URL. Link 406 can include a shortened URL, which may be resolved to its counterpart full URL upon activation. Link 406 may point to the main web domain of CMS 200 (e.g., examplecms.com) or any other related or unrelated domains.

Figure 5:
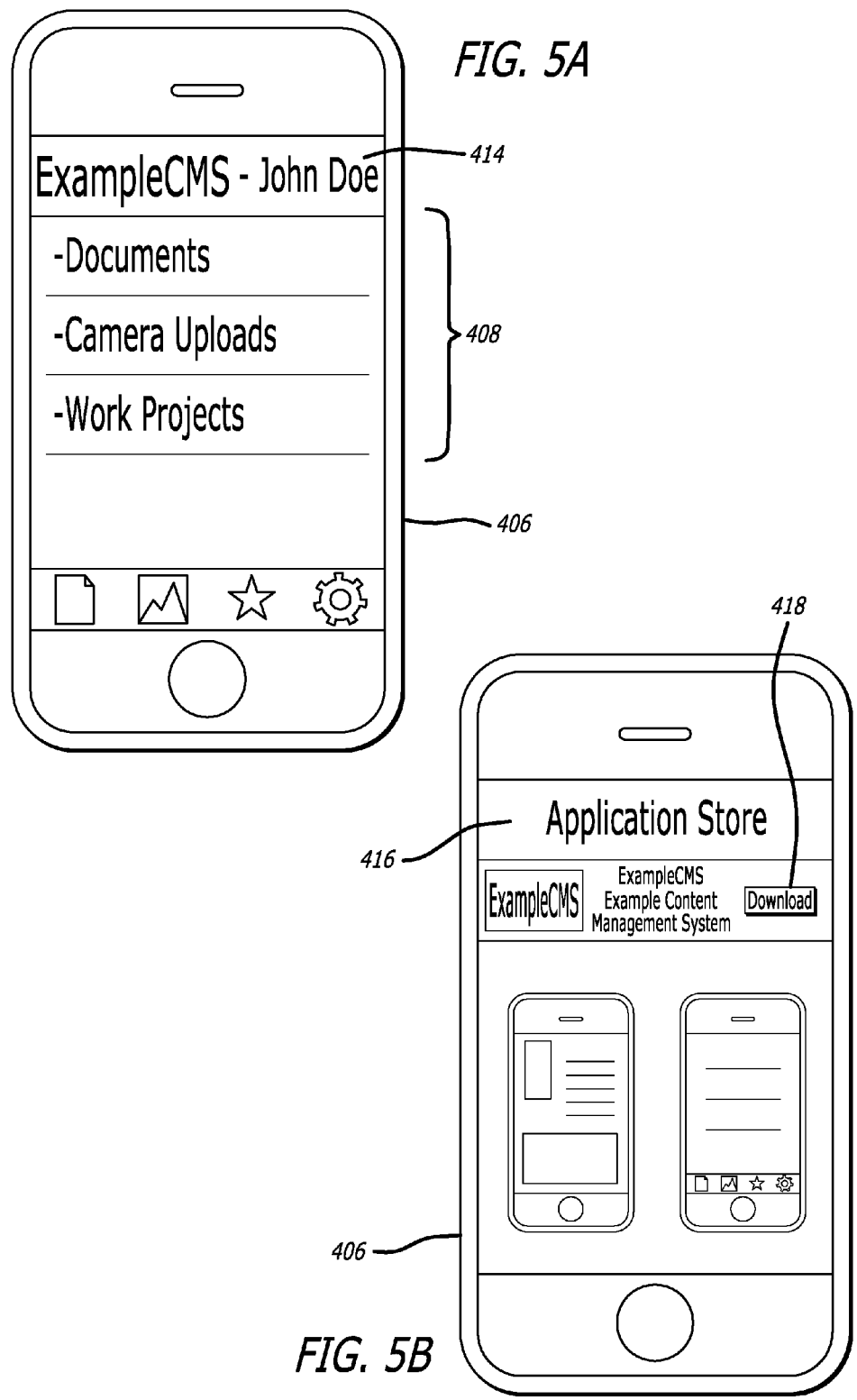
FIG. 5A shows an exemplary mobile device receiving the link when a corresponding content management system application is installed on the mobile device.
FIG. 5B shows the exemplary mobile device receiving the link when the corresponding content management system application is not installed on the mobile device.

FIG. 5A shows an exemplary mobile device receiving the link when a corresponding content management system application is installed on the mobile device. When link 412 is accessed and a mobile app associated with CMS 200 (i.e., CMS client app) is already installed on mobile device 406, the app (i.e., ExampleCMS app) can be automatically launched and log in user account 414 without further prompting the user to enter user credentials such as a username or password. In some aspects, mobile device 406 may be set up in such a way that, at the time of or sometime after the ExampleCMS app is installed, the ExampleCMS app can be registered as the default app to handle any hyperlinks that point to the domain name(s) associated with CMS 200, such as the one that is contained in link 412. As a specific example, mobile device 406 can be set up to designate the ExampleCMS app, currently installed on mobile device 406, as the default handler app for any URL links that reference the domain name "examplecms.com." Subsequently, when the user accesses link 412 (i.e., "www.examplecms.com/by6z49n"), mobile device 406 will recognize link 412 as containing a reference to the domain name "examplecms.com," and automatically invoke the ExampleCMS app that is registered to handle the domain. Mobile device 406 can also pass along link 412 to the ExampleCMS app as a parameter.

The app, in turn, can extract the security code (e.g., "by6z49n") from received link 412 and, if necessary, decode the security code. The security code may include some identifying information for the user account (e.g., "John Doe" 414), such as a unique number (e.g., 102906) associated with the user account, or some identifying information for mobile device 406, such as a serial number, IP address, MAC address, etc. Once the identifying information is extracted, the app can log into the identified user account at the second platform. The app may deny automatic login if the identifying information, contained in link 412, for the user account and/or the device does not match the actual identifying information for John Doe 414 or mobile device 406. Mobile device 406 may have to communicate with CMS 200 to verify the security code and authenticate the user account. For example, mobile device 406 can send the security code back to CMS 200. CMS 200 may compare the received security code value to the stored value that CMS 200 has stored within itself at the time the security code was generated. If a match is found, CMS 200 can send an acknowledgement message to mobile device 406. On the other hand, if the received code value is different from the stored code value, CMS 200 can send a notification to mobile device 406 that the user account could not be successfully authenticated.

Once the ExampleCMS app determines for itself or receives an authentication message from CMS 200, it can safely log into the user account (i.e., "John Doe"). In other words, since the user John Doe had already authenticated himself once at the first access platform (i.e., web interface 106) and link 412 had been generated by CMS 200 based on that authentication, the second access platform (i.e., ExampleCMS app on mobile device 406) can safely assume that the user account may be authenticated at the second access platform. Thus, mobile device 406 may not only automatically launch the ExampleCMS app and display menu items 408, it can also automatically log into the user account "John Doe" 414 on mobile device 406. Optionally, the app may ask the user to verify the user account first before logging into the account. For example, the app may display to the user a confirmation dialog box with the message, "We will log you in as John Doe. Press 'Yes' to continue." The user can either accept or reject this offer to automatically log him in as John Doe. If the user chooses, "Yes," then the app may log the user in as John Doe without asking for a username or password.

In some other embodiments where mobile device 406 may not support registration of a default app for handling a link referencing a specific domain name, mobile device 406 may launch a generic link handler such as a web browser when the user accesses link 412. In such a case, link 412 can be forwarded to the web browser, and the browser can automatically navigate to the URL contained in link 412 (i.e., "www.examplecros.com/by6z49n"). Accordingly, CMS 200 can receive the token (i.e., "by6z49n") through its web domain "examplecms.com" when link 412 is accessed through the web browser on mobile device 406. Consequently, CMS 200 can leave a cookie on mobile device 406. The cookie can include the token value (i.e., "by6z49n". Optionally, CMS 200 can be configured to leave the cookie on mobile device 406 only when the token is successfully verified. However, as will be discussed in further detail below, verification of the token can be done at a later stage after a client app is launched on mobile device 406.

The next time the client app is launched on mobile device 406, either by the user or by an automated trigger, the app can check the web browser and retrieve the token stored inside the cookie. The app can then use the token to log in the appropriate user account. As discussed above, the app may verify the token itself or it can send the token back to CMS 200 for verification.

FIG. 5B shows the exemplary mobile device receiving the link when the corresponding content management system application is not installed on the mobile device. When link 412 is accessed by the user but a mobile app associated with CMS 200 (i.e., CMS client app) is not installed on mobile device 406 yet, mobile device 406 can be configured to launch application store 416 so that the user can easily download the app. Application store 416 can be, for example, iTunes Store®, Google Play Store®, Windows Phone Store®, etc. When link 412 is accessed, the default URL handler, typically a web browser, may be first launched, and once the web browser navigates to the URL "www.examplecms.com/by6z49n," CMS 200 may redirect the web browser to an appropriate application store depending on the type of device or operating system being used. As discussed above, CMS 200 may also leave an HTTP cookie on mobile device 406 before redirecting the web browser to application store 416.

Application store 416 can be a website accessed via the web browser or it can be a dedicated stand-alone app, which can be automatically launched when the web browser is redirected to a URL associated with application store 416. The download page for the ExampleCMS app may also be automatically launched within application store 416. Such page may display download link 418 that the user may access to download the appropriate CMS client app. Once the download is complete, the app can be automatically launched, or the user can manually launch the app. Once the app is launched, it can automatically log in the user account as discussed above. Application store 416 can forward link 412 to the app when the app is launched for the first time after the download. Otherwise, the app may retrieve the cookie left by the web browser when the browser visited the CMS website.

Figure 6:
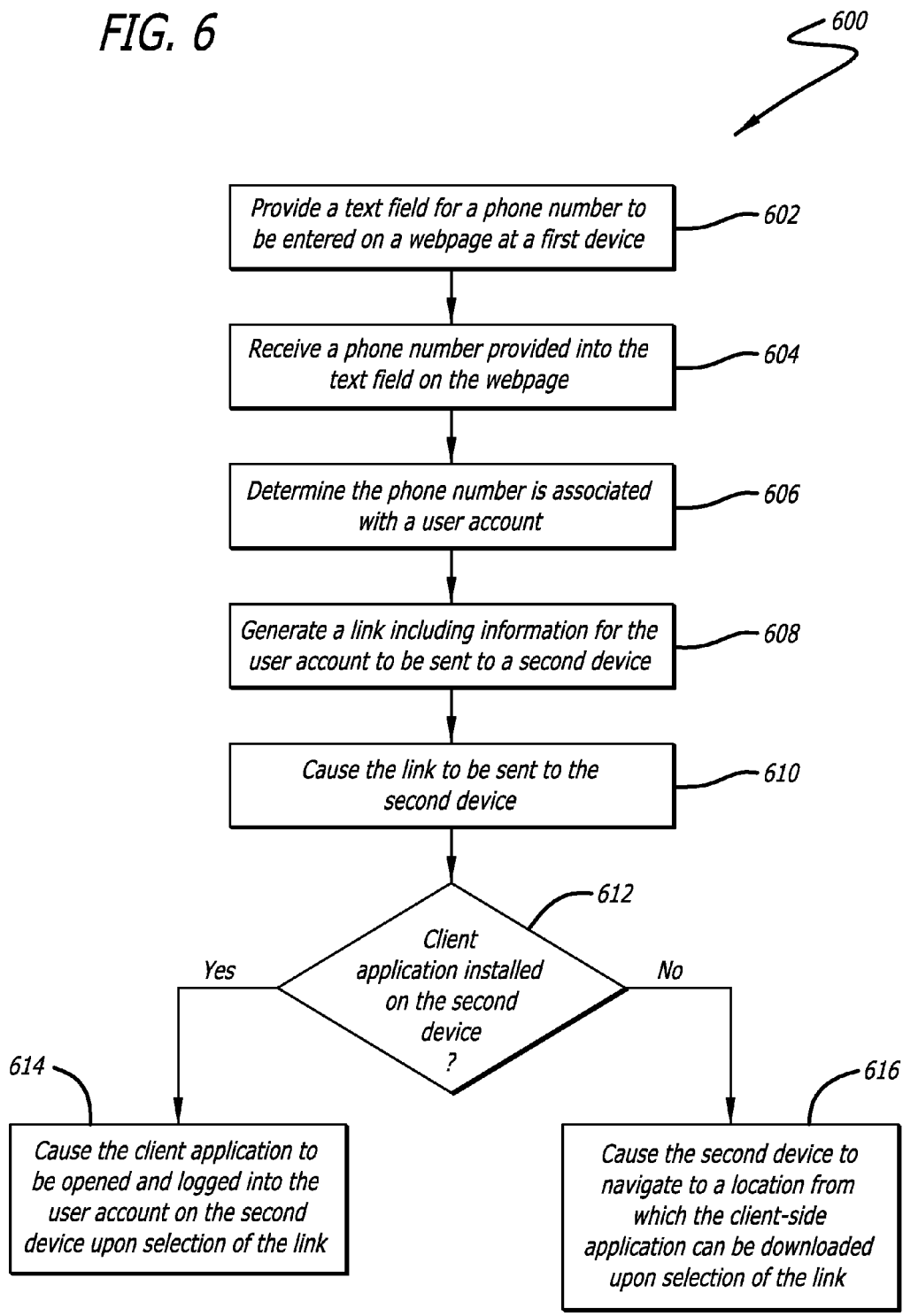
FIG. 6 shows an exemplary method of authenticating a user account at a device by sending a link to a phone number.
Figure 7:
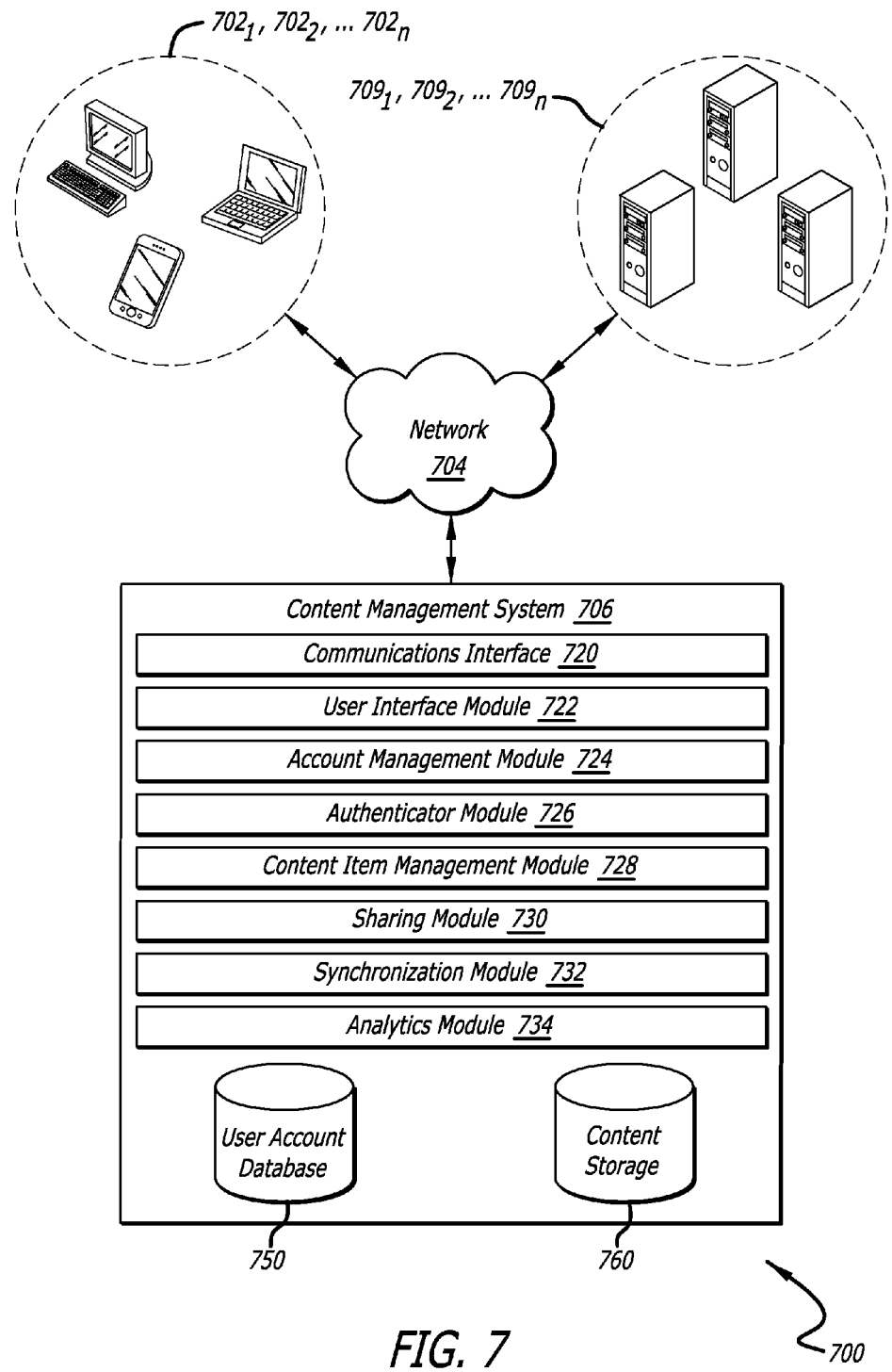
FIG. 7 shows an exemplary configuration of devices and a network in accordance with the invention.

Having disclosed some basic concepts, the disclosure now turns to the example method embodiment shown in FIG. 6. For the sake of clarity, the methods are described in terms of system 700, as shown in FIG. 7 and discussed below in more detail, configured to practice the method. Alternatively, however, the method may also be practiced by system 800 as shown in FIG. 8A or system 850 as shown in FIG. 8B. It is to be noted that, although the inventive techniques disclosed herein are described in relation to online content management systems throughout this disclosure, they may also be practiced with regards to any system that may require authentication. The steps outlined herein are exemplary and can be implemented in any combination thereof in any order, including combinations that exclude, add, or modify certain steps.

FIG. 6 shows an exemplary method of authenticating a user account at a device by sending a link to a phone number. In exemplary method 600, system 700 may provide a text field for a phone number to be entered on a webpage at a first device (602). The text field can be part of a web interface displayed on the webpage. The webpage, the web interface, and/or the first device, or a combination of some or all of them can be considered a first access platform for a content management system. The phone number may be a unique identifier for a second access platform such as a mobile device. Other identifiers may be used, such as an IP address, a MAC address, an email address, a serial number, etc. System 700 can then receive a phone number provided into the text field on the webpage (604). The phone number can be provided by a user having a user account with the content management system. The content management system can receive, via the first access platform, an identifier, such as the phone number, associated with a second access platform such as a device. The user may have already provided user credentials to the first access platform to have her user account authenticated prior to entering the phone number. System 700 may determine that the phone number is associated with a user account (606). System 700 can maintain a database of user accounts and their associated phone numbers. By looking up a phone number in the database, system 700 can identify the user account that is associated with the phone number. In some aspects, system 700 can look up the phone number and identify the user account without having the user provide security information first, such as a username or password.

System 700 can then generate a link including information for the user account to be sent to a second device (608). The link can be a hyperlink that contains a URL. The information for the user account can be a unique user account number or string. The information can be encoded or embedded into the link in the form of a token or security code. The security code can be uniquely generated for the user account and/or the second device. The second device may be considered a second access platform for the content management system. The second device can be, for example, a desktop computer, a laptop computer, a tablet computer, a mobile device, a telephone, a smartphone, a wearable computer, a web browsing application, a dedicated client application, a desktop application, a mobile application, etc.

System 700 can then cause the link to be sent to the second device (610). The link can be sent to the second device based on a communication mechanism or method that is available to the second device. For example, the link can be delivered to the second device by a text message, an email, an instant message, a voice call, a video call, a mail, etc. The link can be sent to the second device by using the identifier (e.g., phone number) that had been provided by the user at the first access platform. The link can be configured, when accessed by the second device, to authenticate a user account associated with the second device at the second access platform. The user account may also be associated with the first access platform. System 700 can then determine whether a client application is installed on the second device (612). The determination can be made when the user activates the link, for example, by touching, tapping, pressing, or clicking on the link. The client application can be an application specifically designed to work in concert with the content management system. The client application can allow the user to access, from the second device, the user's content synchronized with the content management system.

If the client application is already installed on the second device, system 700 can cause the client application to be opened and logged into the user account on the second device upon selection of the link (614). The user account is the one that is associated with the phone number previously provided into the text field on the webpage. The client application can be launched without needing a further command or interaction from the user. The application can be logged into the user account without requiring the user to submit her user credentials such as a username or password. This can be accomplished by using the token that was included in the link. System 700 can extract the user account information from the token and verify that the user account may be safely authenticated.

If, on the other hand, the client application is not installed on the second device yet, system 700 can cause the second device to navigate to a location from which the client-side application can be downloaded upon selection of the link (616). The location can be represented by a URL. The location can be an application store, where various applications can be downloaded and installed on to the second device. Upon downloading the client application, the client application can be automatically or manually launched. When the application is launched for the first time after its installation, the application can retrieve the token from the link and automatically log into the user account. The token can be forwarded to the application by the application store or retrieved from an HTTP cookie that has been previously generated and left on the second device by a web browser on the second device.

FIG. 7 shows an exemplary configuration of devices and a network in accordance with the invention. An exemplary system configuration 700 for enabling access to content of a compressed content item from a variety of computing devices is shown in FIG. 7, wherein computing devices communicate via a network for purposes of exchanging content and other data. The system can be configured for use on a wide area network such as that illustrated in FIG. 7. However, the present principles are applicable to a wide variety of network configurations that facilitate the intercommunication of electronic devices. For example, each of the components of system 700 in FIG. 7 can be implemented in a localized or distributed fashion in a network.

In system 700, a user can interact with content management system 706 through computing devices $702_1$, $702_2$, ..., $702_n$ (collectively "702") connected to network 704 by direct and/or indirect communication. Content management system 706 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 702 can be of varying type, capabilities, operating systems, etc. Furthermore, content management system 706 can concurrently accept connections from and interact with multiple computing devices 702.

A user can interact with content management system 706 via a client-side application installed on computing device $702_i$. In some embodiments, the client-side application can include a content management system specific component. For example, the component can be a stand-alone application, one or more application plug-ins, and/or a browser extension. However, the user can also interact with content management system 706 via a third-party application, such as a web browser, that resides on computing device $702_i$ and is configured to communicate with content management system 706. In either case, the client-side application can present a user interface (UI) for the user to interact with content management system 706. For example, the user can interact with the content management system 706 via a client-side application integrated with the file system or via a webpage displayed using a web browser application. Each of computing devices 702 and any client-side or third-party applications running on computing devices 702 may be considered an access platform, by which a user may access synchronized content on content management system 706.

Content management system 706 can make it possible for a user to store content, as well as perform a variety of content management tasks, such as retrieve, modify, browse, and/or share the content. Furthermore, content management system 706 can make it possible for a user to access the content from multiple computing devices 702. For example, computing device $702_i$ can upload content to content management system 706 via network 704. The content can later be retrieved from content management system 706 using the same computing device $702_i$ or some other computing device $702_j$.

To facilitate the various content management services, a user can create an account with content management system 706. The account information can be maintained in user account database 750. User account database 750 can store profile information for registered users. In some cases, the only personal information in the user profile can be a username and/or email address. However, content management system 706 can also be configured to accept additional user information.

User account database 750 can also include account management information, such as account type, e.g. free or paid; usage information, e.g. file edit history; maximum storage space authorized; storage space used; content storage locations; security settings; personal configuration settings; content sharing data; etc. Account management module 724 can be configured to update and/or obtain user account details in user account database 750. Account management module 724 can be configured to interact with any number of other modules in content management system 706.

An account can be used to store content, such as digital data, documents, text files, audio files, video files, etc., from one or more computing devices 702 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 760. Content storage 760 can be a storage device, multiple storage devices, or a server. Alternatively, content storage 760 can be a cloud storage provider or network storage accessible via one or more communications networks. Content management system 706 can hide the complexity and details from computing devices 702 so that computing devices 702 do not need to know exactly where the content items are being stored by content management system 706. In one variation, content management system 706 can store the content items in the same folder hierarchy as they appear on computing device $702_i$. However, content management system 706 can store the content items in its own order, arrangement, or hierarchy. Content management system 706 can store the content items in a network accessible storage (SAN) device, in a redundant array of inexpensive disks (RAID), etc. Content storage 760 can store content items using one or more partition types, such as FAT, FAT32, NTFS, EXT2, EXT3, EXT4, ReiserFS, BTRFS, and so forth.

Content storage 760 can also store metadata describing content items, content item types, and the relationship of content items to various accounts, folders, or groups. The metadata for a content item can be stored as part of the content item or can be stored separately. In one variation, each content item stored in content storage 760 can be assigned a system-wide unique identifier.

Content storage 760 can decrease the amount of storage space required by identifying duplicate files or duplicate segments of files. Instead of storing multiple copies, content storage 760 can store a single copy and then use a pointer or other mechanism to link the duplicates to the single copy. Similarly, content storage 760 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 706 can be configured to support automatic synchronization of content from one or more computing devices 702. The synchronization can be platform agnostic. That is, the content can be synchronized across multiple computing devices 702 of varying type, capabilities, operating systems, etc. For example, computing device $702_i$ can include client software, which synchronizes, via a synchronization module 732 at content management system 706, content in computing device $702_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 706. Conversely, the background process can identify content that has been updated at content management system 706 and synchronize those changes to the local folder. The client software can provide notifications of synchronization operations, and can provide indications of content statuses directly within the content management application. Sometimes computing device $702_i$ may not have a network connection available. In this scenario, the client software can monitor the linked folder for file changes and queue those changes for later synchronization to content management system 706 when a network connection is available. Similarly, a user can manually stop or pause synchronization with content management system 706.

A user can also view or manipulate content via a web interface generated and served by user interface module 722. For example, the user can navigate in a web browser to a web address provided by content management system 706. Changes or updates to content in the content storage 760 made through the web interface, such as uploading a new version of a file, can be propagated back to other computing devices 702 associated with the user's account. For example, multiple computing devices 702, each with their own client software, can be associated with a single account and files in the account can be synchronized between each of the multiple computing devices 702.

Content management system 706 can include a communications interface 720 for interfacing with various computing devices 702, and can interact with other content and/or service providers $709_1$, $709_2$, ..., $709_n$ (collectively "709") via an Application Programming Interface (API). Certain software applications can access content storage 760 via an API on behalf of a user. For example, a software package, such as an app on a smartphone or tablet computing device, can programmatically make calls directly to content management system 706, when a user provides credentials, to read, write, create, delete, share, or otherwise manipulate content. Similarly, the API can allow users to access all or part of content storage 760 through a web site.

Content management system 706 can also include authenticator module 726, which can verify user credentials, security tokens, API calls, specific computing devices, and so forth, to ensure only authorized clients and users can access files. Authenticator module 726 may generate security codes or tokens to be included in authentication links. Authenticator module 726 may also store the generated tokens, for example, in user account database 750, and compare the token values with the received tokens when the links are activated at the second access platform. Further, content management system 706 can include analytics module 734 module that can track and report on aggregate file operations, user actions, network usage, total storage space used, as well as other technology, usage, or business metrics. A privacy and/or security policy can prevent unauthorized access to user data stored with content management system 706.

Content management system 706 can include sharing module 730 for managing sharing content publicly or privately. Sharing content publicly can include making the content item accessible from any computing device in network communication with content management system 706. Sharing content privately can include linking a content item in content storage 760 with two or more user accounts so that each user account has access to the content item. The sharing can be performed in a platform agnostic manner. That is, the content can be shared across multiple computing devices 702 of varying type, capabilities, operating systems, etc. The content can also be shared across varying types of user accounts.

In some embodiments, content management system 706 can include a content item management module 728 for maintaining a content directory. The content directory can identify the location of each content item in content storage 760. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 706 can use the content path to present the content items in the appropriate folder hierarchy.

A content entry can also include a content pointer that identifies the location of the content item in content storage 760. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 730 can be configured to add a user account identifier to the content entry associated with the content item, thus granting the added user account access to the content item. Sharing module 730 can also be configured to remove user account identifiers from a content entry to restrict a user account's access to the content item.

To share content publicly, sharing module 730 can be configured to generate a custom network address, such as a uniform resource locator (URL), which allows any web browser to access the content in content management system 706 without any authentication. To accomplish this, sharing module 730 can be configured to include content identification data in the generated URL, which can later be used to properly identify and return the requested content item. For example, sharing module 730 can be configured to include the user account identifier and the content path in the generated URL. Upon selection of the URL, the content identification data included in the URL can be transmitted to content management system 706 which can use the received content identification data to identify the appropriate content entry and return the content item associated with the content entry.

In addition to generating the URL, sharing module 730 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 730 can be configured to change the value of the flag to 1 or true after generating a URL to the content item.

In some embodiments, sharing module 730 can also be configured to deactivate a generated URL. For example, each content entry can also include a URL active flag indicating whether the content should be returned in response to a request from the generated URL. For example, sharing module 730 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 730 can reactivate the URL by again changing the value of the URL active flag to 1 or true. A user can thus easily restore access to the content item without the need to generate a new URL.

While content management system 706 is presented with specific components, it should be understood by one skilled in the art, that the architectural configuration of system 706 is simply one possible configuration and that other configurations with more or less components are also possible.

FIG. 8A, and FIG. 8B show exemplary possible system embodiments. The more appropriate embodiment will be apparent to those of ordinary skill in the art when practicing the present technology. Persons of ordinary skill in the art will also readily appreciate that other system embodiments are possible.

FIG. 8A shows a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B shows a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 850 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

The invention claimed is:

1. A computer-implemented method comprising:
    receiving, from a first user device, at a content management system an identifier associated with a second user device, wherein the first user device is associated with a verified user account, wherein the content management system maintains a database of user accounts and identifiers;
    generating, based on the database and via a processor at the content management system, a link, comprising a security code associated with the verified user account and wherein the security code is unique to the verified user account and access platform; and
    sending the link to the second user device by using the identifier, wherein the link, when accessed at the second user device, is configured to automatically authenticate an application associated with the content management system to access the verified user account on the second user device using the security code.

2. The computer-implemented method of claim 1, wherein the identifier is a phone number.

3. The computer-implemented method of claim 1, wherein the link comprises a uniform resource locator (URL).

4. The computer-implemented method of claim 1, wherein the security code is uniquely generated for the user account.

5. The computer-implemented method of claim 1, wherein the security code is uniquely generated for a second access platform.

6. The computer-implemented method of claim 1, wherein the link is sent to the second user device via a text message.

7. The computer-implemented method of claim 1, wherein the link, when accessed at the second user device, is further configured to:
   when an application associated with the content management system is installed on the second user device:
      open the application; and
      log the application into the user account; and
   when the application is not installed on the second user device:
      cause the second user device to navigate to a URL where the application can be downloaded on to the device; and
      log the application into the user account.

8. The computer-implemented method of claim 7, wherein the URL is associated with an application store.

9. The computer-implemented method of claim 1, further comprising:
   prior to receiving the identifier, authenticating the user account at the first user device.

10. A system comprising:
   a processor; and
   a non-transitory computer-readable storage medium storing instructions which, when executed by the processor, cause the processor to perform operations comprising:
      receiving, at a second device associated with a user account, a link from a content management system, wherein the content management system associates the second device to a verified user account based on an identifier received at the content management system from a first device and wherein the content management system maintains a database of user accounts and identifiers, the link comprising a security code that uniquely identifies the second device and the user account based on the identifier;
      accessing the link at the second device; and
      by using the code, automatically authenticating an application associated with the content management system allowing the application to access the verified user account on the second device.

11. The system of claim 10, the non-transitory computer-readable storage medium storing additional instructions which, when executed by the processor, cause the processor to perform further operations comprising:
   receiving a phone number associated with the second device at the content management system,
   wherein the link is received from the content management system via a text message to the phone number.

12. The system of claim 10, the non-transitory computer-readable storage medium storing additional instructions which, when executed by the processor, cause the processor to perform further operations comprising:
   when the application is not installed on the second device at a time that the link is accessed, installing the application on the second device prior to authenticating the user account on the device.

13. The system of claim 10, wherein the user account is authenticated on the application without receiving user credential information from a user after receiving the link.

14. A computer-readable storage device storing instructions which, when executed by a processor, cause the processor to perform operations comprising:
   receiving, from a first user device, at a content management system, an identifier associated with a second user device, wherein the first user device is associated with a verified user account, wherein the content management system maintains a database of user accounts and identifiers;
   generating, based on the database, at the content management system, a link, comprising a security code associated with the verified user account and wherein the security code is unique to the verified user account and access platform; and
   sending the link to the second user device by using the identifier, wherein the link, when accessed by the second user device, is configured to automatically authenticate the second user device using the security code and associate the second user device with the verified user account.

* * * * *